US012579689B2

(12) United States Patent
Kompanek et al.

(10) Patent No.: US 12,579,689 B2
(45) Date of Patent: Mar. 17, 2026

(54) CORRECTION OF CAMERA CONFIGURATION

(71) Applicant: GENETEC INC., Saint-Laurent (CA)

(72) Inventors: Matej Kompanek, Ivanka pri Dunaji (SK); Matej Kopcik, Bruck an der Leitha (AU)

(73) Assignee: GENETEC INC., Saint-Laurent (CA)

( * ) Notice: Subject to any disclaimer, the term of this patent is extended or adjusted under 35 U.S.C. 154(b) by 190 days.

(21) Appl. No.: 18/493,092

(22) Filed: Oct. 24, 2023

(65) Prior Publication Data

US 2025/0131593 A1    Apr. 24, 2025

(51) Int. Cl.
| | |
|---|---|
| *G06T 7/80* | (2017.01) |
| *H04N 23/61* | (2023.01) |
| *H04N 23/63* | (2023.01) |
| *H04N 23/661* | (2023.01) |
| *H04N 23/695* | (2023.01) |

(52) U.S. Cl.
CPC .............. *G06T 7/80* (2017.01); *H04N 23/61* (2023.01); *H04N 23/635* (2023.01); *H04N 23/661* (2023.01); *H04N 23/695* (2023.01); *G06T 2207/30232* (2013.01)

(58) Field of Classification Search
CPC .... H04N 23/635; H04N 23/661; H04N 23/61; H04N 23/695; G06T 7/80; G06T 2207/30232
USPC ...................................................... 348/211.3
See application file for complete search history.

(56) References Cited

U.S. PATENT DOCUMENTS

| | | | |
|---|---|---|---|
| 6,011,585 A | 1/2000 | Anderson | |
| 6,148,149 A | 11/2000 | Kagle | |
| 6,747,693 B1 | 6/2004 | Yamashita et al. | |
| 8,896,632 B2 | 11/2014 | Macdougall et al. | |
| 9,177,360 B2 * | 11/2015 | Cieplinski ................. | G06T 7/30 |
| 9,286,680 B1 | 3/2016 | Jiang et al. | |
| 9,342,143 B1 | 5/2016 | Rhodes et al. | |
| 9,628,688 B2 | 4/2017 | Martin et al. | |
| 9,996,752 B2 * | 6/2018 | Pham ........................ | G06T 7/73 |
| 11,019,244 B2 * | 5/2021 | Clynne .................. | H04N 23/51 |

(Continued)

FOREIGN PATENT DOCUMENTS

| | | |
|---|---|---|
| FR | 3052317 | 12/2017 |
| JP | 2010178015 | 8/2010 |
| JP | 2014143458 | 8/2014 |

*Primary Examiner* — Pritham D Prabhakher
(74) *Attorney, Agent, or Firm* — NORTON ROSE FULBRIGHT CANADA LLP

(57) ABSTRACT

The present disclosure relates to systems, methods, and apparatuses for correcting a camera configuration used in fixed-position surveillance. A video stream generated by the surveillance camera is obtained. A pattern present in pixel data of a frame of the video stream is analyzed to derive an initial orientation setting of the surveillance camera. An orientation delta between the initial orientation setting of the surveillance camera and a desired orientation setting for the surveillance camera is determined based on the analyzing of the pattern present in the pixel data of the frame. A configuration change for the surveillance camera is generated. The configuration change is provided to the surveillance camera to cause the surveillance camera to update the initial orientation setting of the surveillance camera.

29 Claims, 5 Drawing Sheets

Method 410

Obtaining a video stream generated by the surveillance camera ~412

Analyzing a pattern present in pixel data of a frame of the video stream to derive an initial orientation setting of the surveillance camera ~414

Determining an orientation delta between the initial orientation setting of the surveillance camera and a desired orientation setting for the surveillance camera based on the analyzing of the pattern present in the pixel data of the frame ~416

Generating a configuration change for the surveillance camera ~418

Issuing an alert to an operator of a surveillance system associated with the surveillance camera ~420

Providing the configuration change to the surveillance camera to cause the surveillance camera to update the initial orientation setting of the surveillance camera ~422

Obtaining additional frames of the video stream having a different orientation than an orientation of the frame of the video stream ~424

(56) References Cited

U.S. PATENT DOCUMENTS

| | | | |
|---|---|---|---|
| 11,688,171 B2 * | 6/2023 | Carranza | G06V 20/62 |
| | | | 382/103 |
| 12,198,395 B2 * | 1/2025 | Taheri | G06T 7/74 |
| 2006/0061599 A1 | 3/2006 | Yu et al. | |
| 2014/0071308 A1 | 3/2014 | Cieplinski et al. | |
| 2016/0094764 A1 * | 3/2016 | Martin | G08B 13/19636 |
| | | | 348/208.2 |
| 2016/0180196 A1 * | 6/2016 | Taylor | G06V 10/50 |
| | | | 382/103 |
| 2016/0373647 A1 * | 12/2016 | García Morate | H04N 23/635 |
| 2018/0060669 A1 * | 3/2018 | Pham | G06T 7/80 |
| 2022/0094844 A1 * | 3/2022 | Deng | H04N 7/181 |
| 2022/0122275 A1 * | 4/2022 | Carranza | G06V 20/52 |
| 2022/0230410 A1 * | 7/2022 | Taheri | G06T 7/55 |
| 2022/0301277 A1 * | 9/2022 | Xu | G06V 10/255 |
| 2022/0394183 A1 | 12/2022 | Nagai et al. | |

* cited by examiner

100

110          112

120          112          130

210

212          214          216

110          112

Method
410

Obtaining a video stream generated by the surveillance camera ⌐412

Analyzing a pattern present in pixel data of a frame of the video stream to derive an initial orientation setting of the surveillance camera ⌐414

Determining an orientation delta between the initial orientation setting of the surveillance camera and a desired orientation setting for the surveillance camera based on the analyzing of the pattern present in the pixel data of the frame ⌐416

Generating a configuration change for the surveillance camera ⌐418

Issuing an alert to an operator of a surveillance system associated with the surveillance camera ⌐420

Providing the configuration change to the surveillance camera to cause the surveillance camera to update the initial orientation setting of the surveillance camera ⌐422

Obtaining additional frames of the video stream having a different orientation than an orientation of the frame of the video stream ⌐424

FIG. 4A

Method
430

Obtaining a request to enroll a surveillance camera — 432

Obtaining an orientation validation request for the surveillance camera — 434

Enrolling the camera — 436

To Method 410

500

CORRECTION OF CAMERA CONFIGURATION

FIELD

The present disclosure relates video surveillance, and more specifically to configurable surveillance cameras.

BACKGROUND

A surveillance system is a network of various devices employed to monitor activities and behaviours of persons, vehicles, or the like in a particular area being surveilled. A surveillance system may collect information from a variety of sources, centralize that information, and make the information available to surveillance personnel to aid them in making decisions relating to the safety of persons or other objects within the area being surveilled. A surveillance network may include any suitable number of devices for collecting information, including cameras, microphones, access card readers, and the like, as well as any number of monitors or other interfaces for presenting information to operators of the surveillance system. In the case of a video surveillance system, information (e.g., video streams) acquired by cameras or similar devices may be centralized in a video management system (VMS).

In order to provide information to a VMS, a camera (or similar device) is first physically installed and connected to a surveillance network via which the camera can communicate with the VMS. Then, the camera is configured to communicate with the VMS: this second process is typically called "enrollment". The enrollment process for a camera (or similar device) involves establishing a configuration for the camera. The configuration details a number of different parameters which dictate how the camera is to connect to the VMS, what format, resolution, frame rate, etc. of video the camera is to produce, when the camera is to record, what metadata to produce, and the like. Typically, upon enrollment, the VMS (or another element of the surveillance system) will produce a configuration file and transmit it to the camera; upon receipt of the configuration file, the camera will update its configuration parameters based on the configuration file, causing the camera to change behaviour to align with the parameters dictated by the configuration file.

Frequently, the personnel which performs the physical installation and connection is separate from the personnel responsible for enrollment. Moreover, the two steps may be separated by a considerable time lag, on the order or hours, days, or even weeks. As a result, it can occur that the personnel responsible for enrollment of a camera are not properly made aware of the physical installation parameters of a camera; this can result in a mismatch between the real-world installation parameters and the configuration parameters provided to the VMS and/or to the camera by the VMS.

As such, approaches for correcting the configuration of cameras are desirable.

SUMMARY

The following presents a simplified summary of one or more implementations in accordance with aspects of the present disclosure in order to provide a basic understanding of such implementations, without limiting the embodiments presented within the present disclosure.

A surveillance system may include any number of surveillance cameras, which produce video streams of surveillance video for output to a VMS. Depending on the particular needs of the organization deploying a surveillance system, monitoring devices, such as surveillance cameras, may be installed in a variety of fashions and locations. Specifically, surveillance cameras may be installed in a variety of orientations: while some cameras are installed upright, such as those which hang from a frame or are mounted on an elevated surface, some others are installed upside-down (i.e., reversed from a normal orientation), for example on a ceiling, or at a right angle, for example on a wall or other vertical surface. Although a camera may be configured to rotate a video stream prior to output to the VMS, most surveillance cameras are not equipped with gyroscopes or similar sensors, and thus cannot determine their mounting orientation directly.

The present disclosure provides approaches for correcting the configuration of a fixed-position surveillance camera when an existing configuration of the camera does not match the actual physical orientation of the camera, resulting in the camera providing video that is undesirably rotated (or the like). Starting from a video stream generated by the surveillance camera, pixel data of a frame of the video stream is analyzed to derive an initial orientation setting for the camera. Then, a difference between the existing orientation setting of the camera and a desired orientation setting is determined. This difference may indicate that the camera is upside-down, at a right angle, or at some other orientation, different from what was established in the initial configuration setting. A configuration change for the camera is generated and then provided to the camera to cause the camera to update the initial configuration setting. This results in subsequent frames of the video stream, as well as future video streams, having a different orientation than the frame used to analyze the initial orientation setting of the surveillance camera.

In accordance with a broad aspect, there is provided a method for correcting a camera configuration for a fixed position surveillance camera. A video stream generated by the surveillance camera is obtained, the video stream comprising a plurality of frames. A pattern present in pixel data of a frame of the video stream is analyzed to derive an initial orientation setting of the surveillance camera. An orientation delta between the initial orientation setting of the surveillance camera and a desired orientation setting for the surveillance camera is determined based on the analyzing of the pattern present in the pixel data of the frame. A configuration change for the surveillance camera is generated. The configuration change is provided to the surveillance camera to cause the surveillance camera to update the initial orientation setting of the surveillance camera.

In at least some embodiments according to any one or more of the previous embodiments, subsequent to providing the configuration change to the surveillance camera, additional frames of the video stream having a different orientation than an orientation of the frame of the video stream.

In at least some embodiments according to any one or more of the previous embodiments, analyzing the pattern present in the pixel data of the frame comprises performing object detection to determine that an orientation of the object differs vis-à-vis an expected orientation for the object.

In at least some embodiments according to any one or more of the previous embodiments, object detection comprises detecting a person.

In at least some embodiments according to any one or more of the previous embodiments, performing object detection comprises detecting a landmark.

In at least some embodiments according to any one or more of the previous embodiments, generating the configuration change comprises generating a configuration change specifying a rotation for future frames of the video stream.

In at least some embodiments according to any one or more of the previous embodiments, generating the configuration change comprises generating a configuration change specifying a reflection for future frames of the video stream.

In at least some embodiments according to any one or more of the previous embodiments, the method comprises, responsive to the determining of the orientation delta, issuing an alert to an operator of a surveillance system associated with the surveillance camera.

In at least some embodiments according to any one or more of the previous embodiments, the method comprises obtaining input from the operator approving the configuration change, the providing of the configuration change occurs responsive to the obtaining of the input from the operator.

In at least some embodiments according to any one or more of the previous embodiments, issuing the alert to the operator comprises presenting a confidence level associated with the determining that the orientation of the object differs vis-à-vis the expected orientation.

In at least some embodiments according to any one or more of the previous embodiments, issuing the alert to the operator comprises presenting a plurality of potential corrections for the surveillance camera to be included in the configuration change.

In at least some embodiments according to any one or more of the previous embodiments, issuing the alert to the operator comprises presenting an indication of a potential installation issue associated with the surveillance camera.

In at least some embodiments according to any one or more of the previous embodiments, the method comprises comparing a confidence level associated with the initial orientation setting with a confidence threshold, and when the confidence level does not meet the confidence threshold, issuing an alert to the operator indicating a potential issue with the surveillance camera.

In at least some embodiments according to any one or more of the previous embodiments, the method forms part of a surveillance camera enrollment method, comprising obtaining a request to enroll the surveillance camera; and responsive to obtaining the request, enrolling the surveillance camera; wherein the obtaining of the video stream occurs subsequent to the enrolling of the surveillance camera.

In at least some embodiments according to any one or more of the previous embodiments, the request to enroll comprises an orientation validation request for the surveillance camera.

In at least some embodiments according to any one or more of the previous embodiments, the obtaining, analyzing, determining, generating, and providing are performed subsequent to identifying an occurrence of an event in a vicinity of the surveillance camera.

In at least some embodiments according to any one or more of the previous embodiments, identifying the occurrence of the event comprises identifying at least one of a weather event, a maintenance event, and an emergency event.

In at least some embodiments according to any one or more of the previous embodiments, the method comprises receiving an orientation validation request from the surveillance camera, and the obtaining, detecting, analyzing, generating, and providing are performed in response to receiving the orientation validation request.

In at least some embodiments according to any one or more of the previous embodiments, the obtaining, analyzing, determining, generating, and providing are repeated periodically.

In at least some embodiments according to any one or more of the previous embodiments, obtaining the video stream comprises obtaining, at a video management system, the video stream from the surveillance camera, and providing the configuration change to the surveillance camera comprises transmitting, from the video management system, the configuration change to the surveillance camera over a network.

In at least some embodiments according to any one or more of the previous embodiments, the method is implemented within the surveillance camera.

In accordance with another broad aspect, there is provided a surveillance camera for use in fixed-position surveillance. The camera comprises an imaging unit, a network interface, a processor in communication with the imaging unit and the network interface, and a non-transitory computer-readable memory storing computer instructions. The computer instructions are executable by the processor for: obtaining a video stream comprising a plurality of frames; detecting at least one object in a frame of the video stream; determining that an orientation of the object differs vis-à-vis an expected orientation for the object; generating a configuration change for the surveillance camera; and updating an existing configuration of the surveillance camera using the configuration change.

In accordance with a further broad aspect, there is provided a surveillance system for use in fixed-position surveillance. The surveillance system comprises a surveillance camera and a server implementing a video management system. The server is in communication with the surveillance camera over a surveillance network. At least one of the surveillance camera and the server comprises a processor and a non-transitory computer-readable memory storing computer instructions. The computer instructions are executable by the processor for: obtaining a video stream comprising a plurality of frames; detecting at least one object in a frame of the video stream; determining that an orientation of the object differs vis-à-vis an expected orientation for the object; generating a configuration change for the surveillance camera; and updating an existing configuration of the surveillance camera using the configuration change.

Additional details and information regarding one or more embodiments, including those described in the preceding paragraphs, are set forth in the accompanying drawings and the description below. Other features and aspects will be apparent from the description and drawings, as well as from the claims.

BRIEF DESCRIPTION OF THE DRAWINGS

For a more complete understanding of the present disclosure, reference is now made to the accompanying drawings. The following brief descriptions of the drawings should not be considered limiting in any fashion.

FIG. 4A is a flowchart illustrating an example method for correcting a camera configuration.

It will be noted that throughout the appended drawings that like features are identified by like reference numerals.

DETAILED DESCRIPTION

The present disclosure relates to, inter alia, methods, systems, devices, and computer-readable media for correcting a camera configuration, which may apply to a fixed-position surveillance camera, or to other devices, as appropriate. For clarity, reference to and discussion of cameras in the present disclosure should be understood as encompassing various types of cameras, for instance video cameras, infrared cameras, black-and-white cameras, motion-based cameras, and the like, generating various forms of media, whether digital or analog (e.g., for later digital conversion), for instance video streams, still images, and the like, in various formats, bitrates, frame rates, and the like, as appropriate.

Figure 1:
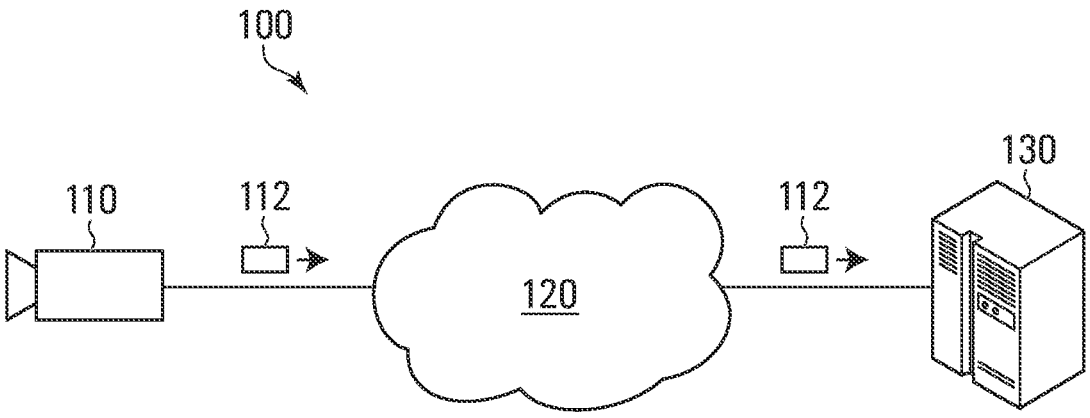
FIG. 1 is a schematic diagram of an example surveillance system.

With reference to FIG. 1, there is illustrated a surveillance system 100, which is composed of a surveillance camera 110 and a server 130 which are connected by a surveillance network 120. Although illustrated here as including only one camera 110 and one server 130, it should be understood that the surveillance system 100 may include any suitable number of cameras (which may be similar to or different from the camera 110) and any suitable number of servers 130 (which may be similar to or different from the server 130). The surveillance network 120 may also include any number of devices, including devices which serve to gather information for surveillance purposes, devices which serve to facilitate connections between devices (including the camera 110 and the server 130), or other devices, as appropriate. Additionally, the surveillance system 100 may be deployed at any suitable type of site where surveillance is desired, including at airports, train stations, or other transit locations; along roads, at intersections, or at other roadways; at stadiums, concert halls, schools, or other locations; or any other suitable location. As will be described in greater detail hereinbelow, the surveillance system 100 may be implemented using various types of computing devices. The computing devices implementing the surveillance system 100 may be deployed locally at the site being surveilled and/or at a remote location, for example using cloud computing resources. In this fashion, the surveillance system may be substantially or entirely on-premises, entirely or largely deployed via cloud resources (i.e., excepting the cameras 110), or deployed both locally on-premises and via cloud resources, as part of a so-called hybrid deployment.

The camera 110 may be any suitable type of camera for acquiring images for use in surveillance. The camera 110 may record video, for example in the form of a video stream 112, or may record still images at a constant or variable frequency, as appropriate. Although the foregoing disclosure will refer primarily to video streams, including the video stream 112, it should be understood that the present disclosure also considers other types of collections of images. In some implementations, the camera 110 has a fixed position:

this may involve the camera 110 be fixedly mounted on a bracket, post, ceiling, wall, or other support structure which ensures that the camera 110 is substantially fixed in position and not prone to motion. In some cases, the camera 110 having a fixed position means that the camera 110 is substantially immobile. In some other cases, the camera 110 having a fixed position means that the camera's 110 motion is substantially limited: for example, the camera 110 may be mounted to a support which allows the camera 110 to rotate along one or more axis at a fixed point (e.g., a PTZ (pan-tilt-zoom) or PT (pan-tilt) camera). It should be understood that the camera 110 may nonetheless be movable despite having a fixed position, for instance due to extreme weather events or other natural disasters, due to protests or other human activity, or the like.

The server 130 may be any suitable type of server for managing part or all of the surveillance system 100, including the camera 110 and any suitable number of other devices within the surveillance network 120. The server 130 may be implemented by way of any number of physical and/or virtual servers, as appropriate. The server 130 may communicate with the camera 110, as well as with any number of other devices within the surveillance network 120, using any suitable communication protocol, as appropriate. In some embodiments, the server 130 executes software for implementing a video management system (VMS) which operates by collecting video stream(s) from one or more cameras (e.g., the video stream 112 from the camera 110), stores the video stream(s) (whether digitally or in an analog format), and provides access to the stored video and/or to live video via one or more interfaces. It should be understood that the embodiments described herein may operate on live video and/or on previously obtained and recorded video, for instance during playback, without departing from the scope of the present disclosure.

Figure 2:
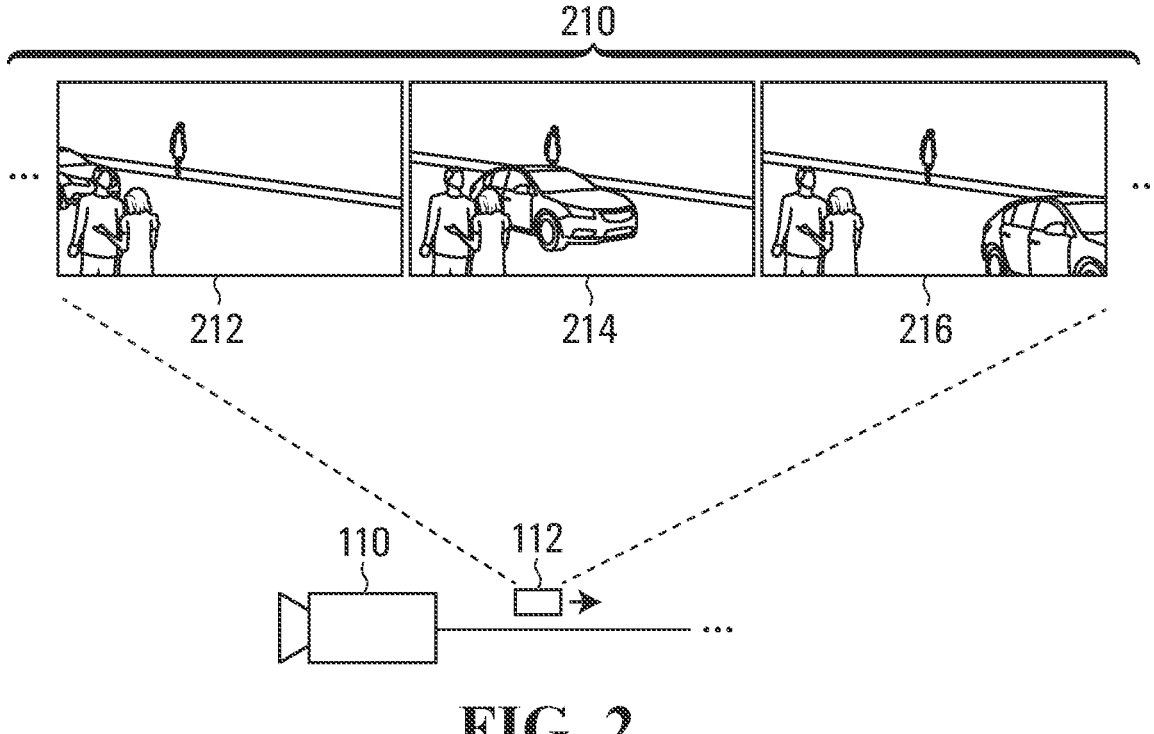
FIG. 2 is a schematic representation of an example video stream produced by a surveillance camera of the surveillance system of FIG. 1.

With reference to FIG. 2, as described hereinabove, the camera 110 generates a video stream 112, which is transmitted through the surveillance network 120 to, for example, the server 130, which may operate a VMS or similar software. It should be noted that the video stream 112 may be transmitted, in whole or in part, to any suitable number of devices, for instance using multicast transmission or similar techniques, or in any other suitable fashion. The video stream 112 is composed of a plurality of frames 210, shown in FIG. 2 as including at least frames 212, 214, and 216 (collectively the "frames 210"). The frames 210 may depict any suitable scene, based on the field of view of the camera 110. The frames 210 may be generated by the camera at any suitable interval, be of any suitable size and resolution, and be in colour, black-and-white, or any other suitable schema.

The camera 110 may also be configurable, which is to say, the operation of the camera may be modified or altered to align with preferred or desired characteristics. Configuration of the camera 110 may be performed by providing a configuration file to the camera 110, which may take any suitable form, for instance as dictated by a manufacturer of the camera 110. The configuration file may be generated, for instance, by the server 130, by any element of the surveillance network 120 (e.g., a configuration server), or, in some cases, by the camera 110 itself, for instance in response to commands or information obtained by the camera 110. In some embodiments, the configuration file serves to update an existing configuration of the camera 110, and specifies those parameters being updated as well as new values for those parameters. In some other embodiments, the configuration file includes a replacement configuration for the camera 110 which specifies a number of parameters for the camera 110, some of which may not necessarily result in a change to the existing parameters of the camera 110.

Depending on the particular implementation of the camera 110, different types of configurations may be possible. In some embodiments, the camera 110 may be configurable to establish a name for the camera, to indicate a VMS or other system to which the video stream 112 should be provided (e.g., the server 130), to identify a location of the camera 110, and the like. In some embodiments, the camera may be configurable to establish a frame rate, bit rate, resolution, or other quality parameters for the video stream 112. Additionally, in some embodiments, the camera 110 may be configurable to establish an orientation for the video stream 112, as will be described in greater detail hereinbelow.

Figure 3:
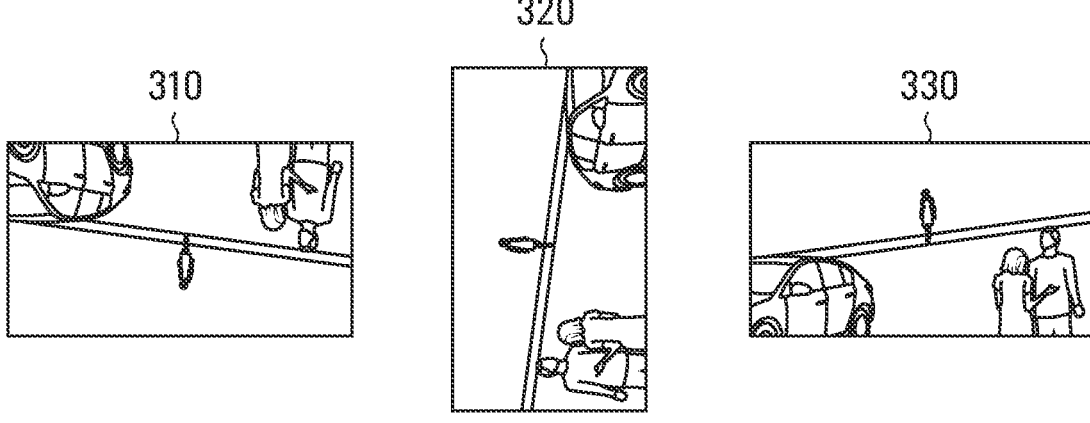
FIG. 3 is a schematic representation of example frames of the video stream of FIG. 2.

With additional reference to FIG. 3, in many cases, the camera 110 will be provided with an initial configuration, for instance by the manufacturer of the camera 110, whether during the manufacturing process, during an initialization process, or the like. The initial configuration for the camera 110 may specify, amongst other parameters, an initial orientation setting for the video stream 112 and the frames 210 thereof. The initial orientation setting for the video stream 112 may be based on certain assumptions or expectations of the entity providing the initial configuration: how the camera 110 is most likely to be installed, how the camera 110 is marketed or sold, and the like. However, when the actual physical installation of the camera 110 differs from the expected installation, the initial configuration of the camera 110 may be inappropriate. Additionally, the camera 110 may, as part of routine maintenance, renovations, or the like, be moved or have its installation updated. In such cases, the initial (or other previous) configuration of the camera may no longer align with the new physical installation of the camera 110.

For example, if the camera 110 is expected to be installed in an upright fashion (i.e., with the expected top portion of the camera facing up), the initial orientation setting of the camera may dictate that the video stream 112 should be produced with a rotation angle of 0°. This may result in the frames 210 of the video stream 112 appearing "right-side up", as with frames 212, 214, and 216. However, if the camera 110 is installed upside-down (i.e., with the expected top portion of the camera instead facing down), the initial orientation setting may be inappropriate, resulting in the video stream 112 including upside-down frames (i.e., rotated 180°), as with the frame 310. Similarly, if the camera 110 is installed at a right-angle (i.e., with the expected top portion of the camera instead facing to the side), the initial orientation setting may be inappropriate, resulting in the video stream 112 including rotated frames (i.e., rotated 90° or) 270°, as with the frame 320. Additionally, in some embodiments, the initial orientation setting of the camera may be inappropriate insofar as the image appears mirrored (i.e., reflected or inverted about a central plane), as with the frame 330, vis-à-vis the frame 216. In some further embodiments, other defects in the orientation of the frames 210 of the video stream 112 may be detected, including rotations at angles different than 90°, 180°, or 270° (e.g., rotations of 23°, 78°, 169°, etc.), incorrect positioning of the camera, poor zoom or focus of the camera, and the like. In these cases, the initial orientation setting of the camera 110 may be undesirable, as the initial orientation setting may result in the video stream 112 being unusable or requiring correction prior to being usable.

To this end, and with reference to FIG. 4A, there is provided a method 410 for correcting a camera configuration for a fixed-position surveillance camera, for instance the camera 110. The method 410 may be implemented by any suitable element of, or any suitable combination of elements of, the surveillance system 100, including by the server 130, by any device within the surveillance network 120, and/or by the camera 110 itself.

As part of step 412, the method 410 includes obtaining a video stream generated by the surveillance camera, for instance the video stream 112 generated by the camera 110. The video stream 112 includes a plurality of frames, for instance the frames 210. The video stream 112 may be obtained by the server 130, by an element of the surveillance network 120, or by an entity within the camera 110, as appropriate, depending on which entity is implementing the method 400.

As part of step 414, the method 410 includes analyzing a pattern present in pixel data of a frame of the video stream 112, for instance the frame 310, 320, or 330, to derive an initial orientation setting of the camera 110. The initial orientation setting may be a default orientation setting that was provisioned in the camera 110 at the time of manufacture or initialization, a previously established orientation setting, for instance provided as part of an enrollment process for the camera 110, or the like. Irrespective of the approach used to perform the analysis, the orientation setting of the camera 110 derived from the analysis of the pattern present in the pixel data of the frames 310, 320, 330 may provide an indication of the physical installation characteristics of the surveillance camera 110 as well as of the configuration applied to the camera 110 which results in the production of the video stream 112. The term "pattern" as used herein does not necessarily imply a periodic or repetitive pattern and may instead be any suitable element of the image, as visible in the pixel data, including object orientation, object pose, or the like.

In some embodiments, the pixel data is analyzed using an object detection algorithm. The object detection algorithm may be any suitable type of algorithm, including computational algorithms, edge detection algorithms, machine learning (ML) algorithms, or the like. For example, the object detection algorithm may employ edge detection to identify the presence of different objects and, in some cases, identify the nature or type of object detected. The object detection algorithm may detect various types of objects, including persons, vehicles, landmarks, other objects, or the like. The algorithm may then compare an actual orientation of the objects in the frame 310, 320, or 330 against an expected orientation for those objects to determine the initial orientation setting of the camera 110. For example, the object detection algorithm may detect that several persons in the frame 310 are in a reverse (i.e., upside-down) orientation, which may be unexpected for the camera 110. By way of another example, the object detection algorithm may detect that the tree in frame 320 is horizontal, rather than vertical, which may be unexpected for the camera 110.

In some other embodiments, the pixel data is analyzed using a ML algorithm trained to detect the orientation of image frames. For example, a ML model may be trained on a corpus of images having random, known orientations. The corpus of images may be acquired in any suitable fashion: for instance, images taken from a public image training set may be cropped and rotated at random angles from an initial, upright orientation. The ML model may then be trained by providing the ML model with images from the corpus and teaching the ML model to identify the orientation of the images. In this fashion, the ML model may be determining the orientation of objects, the pose of persons or objects, the locations of certain parts of particular types of objects, or the like. Various types of ML models may be used, including deep learning models, classification- or regression-based models, histogram of oriented gradient models, support vector machine models, as appropriate.

In some embodiments, the analysis of the pixel data of the frames 310, 320, 330 performed as part of step 414 may be associated with a confidence level. The confidence level may be generated by the ML model (or other algorithm) which analyzes the pixel data of the frames 310, 320, 330 to derive the initial orientation setting. The confidence level may be an indication of how certain the ML model is in the results of the analysis and/or of how certain the ML model is that the derived initial orientation setting is correct. The confidence level may be represented as a certainty percentage, a likelihood of error, or the like, and may be presented to an operator of the system 100, described in greater detail hereinbelow.

As part of step 416, the method 410 includes determining an orientation delta between the initial orientation setting of the camera 110 and a desired orientation setting for the camera 110. The orientation delta is a measure of the difference between the initial orientation setting and the desired orientation setting for the camera 110 and may be based on the analysis performed as part of step 414, that is to say, the analysis of the pattern present in the pixel data of the frame 310, 320, or 330 of the video stream 112. The orientation delta may be determined in any suitable fashion, for instance by comparing the orientation of the frame, or of objects in the frame, to a desired orientation for frames produced by the camera 110. The desired orientation setting for the camera 110 may be established by any suitable element of the surveillance system 100, for instance the server 130. Alternatively, or in addition, the camera 110 may establish, or be provided with, a desired orientation setting. The camera 110 may then use the desired orientation setting internal to the camera 110 to compare against the initial orientation setting determined based on the analysis performed at step 414.

By way of an example, the persons and objects in frame 310 appear reversed (i.e., upside down) vis-à-vis frame 216. As a result, the analysis at step 414 may indicate, based on the analysis of the pixel data of frame 310, that frame 310 is reversed vis-à-vis the desired orientation setting, in which the persons and objects appear upright (i.e., right-side up), as in frame 216. Thus, as part of step 416, the orientation delta is determined to be 180°, though it should be understood that the orientation delta may be represented in any suitable fashion. By way of another example, the persons and objects in frame 320 appear rotated vis-à-vis frame 216. As a result, the analysis at step 414 may indicate, based on the analysis of the pixel data of frame 320, that frame 320 is rotated (in this case, at a right angle) vis-à-vis the desired orientation setting, in which the persons and objects appear upright (i.e., right-side up), as in frame 216. Thus, as part of step 416, the orientation delta is determined to be 90° (or 270°, depending on the reference orientation that is used).

By way of a further example, the persons and objects in frame 330 appear mirrored (i.e., inverted) vis-à-vis frame 216. As a result, the analysis at step 414 may indicate, based on the analysis of the pixel data of frame 330, that frame 310 is mirrored vis-à-vis the desired orientation setting, in which the persons and objects are not reversed, as in frame 216. In some embodiments, the analysis at step 414 may include analyzing text or other similar elements visible in the frame 330 to determine that the initial orientation setting of the camera 110 is mirrored. Thus, as part of step 416, the orientation delta is determined to be mirrored about a central axis. For completeness, it should be understood that the determination of the orientation delta in step 414 is based on analysis of the pattern present in the pixel data of frames 310, 320, 330. The above description comparing the frames 310, 320, 330 to frame 216 is provided for the purposes of illustration and to facilitate the understanding of the present disclosure.

In some embodiments, the determination of the orientation delta may be associated with a confidence level. The confidence level may be generated as part of the comparison of the initial orientation setting and the desired orientation setting, or as part of any other element of the determination of the orientation delta. The confidence level may be an indication of how certain the orientation delta is, or how likely it is that the orientation delta is correct. The confidence level may be represented as a certainty percentage, a likelihood of error, or the like, and may be presented to an operator of the system 100, described in greater detail hereinbelow.

As part of step 418, the method 410 includes generating a configuration change for the camera 110. The configuration change may be embodied in a configuration file (or similar data structure) and may align with a format or guidelines established by the manufacturer of the camera 110. The configuration change generated at step 418 depends on the orientation delta determined at step 416: if the orientation delta is found to be 90°, then the configuration change may instruct the camera 110 to rotate the video stream 112 by −90° (or 270°) prior to output; if the orientation delta is found to be 180°, then the configuration change may instruct the camera 110 to rotate the video stream 112 by 180°. Other configuration changes may apply in other situations, including when the orientation delta indicates a different rotation value (specifying a different rotation), when the orientation delta indicates that the video stream 112 is mirrored (specifying a reflection), or the like. As will be described in greater detail hereinbelow, once provided to the camera 110, the configuration change results in future frames of the video stream 112 having a different orientation than the frames 310, 320, 330, for instance frames which have the orientation of frames 212, 214, 216.

As part of step 420, the method 410 includes issuing an alert to an operator of a surveillance system associated with the camera 110, for instance an operator of the system 100. The alert may be issued to any suitable operator of the system 100, in cases in which the system 100 is operated by multiple operators. In some cases, the alert may be issued on a screen or similar display, which may be coupled to the server 130 or to another element of the surveillance network 120. Additionally, depending on the implementation, the alert may include different information for the operator.

In some embodiments, the alert will solicit input from the operator of the system 100. The input may solicit input from the operator to approve the configuration change generated as part of step 418. For example, the alert may display the frame 310, 320, 330 used to determine the orientation delta and an indication of the proposed configuration change. In some cases, the proposed configuration change may be applied to the frame 310, 320, 330 as an example of what the configuration change will produce for future frames of the video stream 112. By way of another example, the alert may indicate a confidence level associated with the analysis of the pixel data, with the orientation delta, and/or of the configuration change resulting in a corrected orientation setting for the camera 110, which may inform the operator's decision to accept the configuration change. By way of a further example, the alert may present multiple proposed configuration changes—which may be generated collectively as part of step 418—to the operator for the operator to select a preferred configuration change. In this example, the alert may present the frame 310, 320, 330 as well as the proposed configuration changes to assist the operator in selecting the correct configuration change.

In a still further example, the alert may serve to alert the operator of the system 100 to a potential installation issue with the camera 110. In some cases, a particularly low confidence level for the initial orientation setting and/or for the determination of the orientation delta may be an indication that the camera 110 is improperly installed. For example, if the camera 110 is pointed at a wall or at a ceiling, if an object is blocking the view of the camera 110, or in some other situations, the analysis of the pixel data, carried out as part of step 414, may fail to identify the initial orientation setting of the camera 110; alternatively, or in addition, the determination of the orientation delta, carried out as part of step 416, may fail. Failure to derive the initial orientation setting and/or to determine the orientation delta may serve as an indicator that the camera is improperly installed or oriented, that an object is blocking the view of the camera, that the camera has been damaged or tampered with, and the like. Thus, in some embodiments, the operator of the system 100 may be alerted of a potential issue with the camera as part of step 420.

As part of step 422, the method 410 includes providing the configuration change to the camera 110 to cause the camera 110 to update the initial orientation setting of the camera 110. The camera 110 can obtain the configuration change from whichever element of the surveillance system 100 is implementing the method 410: in some embodiments, the server 130 provides the configuration change to the camera 110, in some other embodiments, an element of the surveillance network 120 provides the configuration change to the camera 110, and in some further embodiments, the camera 110 generates the configuration change itself, thereby providing the configuration change to the camera 110. The configuration change may be provided to the camera 110 in any suitable format and fashion, for example by way of a configuration file, or in any other suitable fashion.

In some embodiments, the providing of the configuration change to the camera 110 occurs responsive to obtaining input from the operator of the system 100 approving the configuration change, as described in relation to step 420 hereinabove. In some other embodiments, the providing of the configuration change to the camera 110 occurs once the configuration change has been generated, as described in relation to step 418 hereinabove. By way of an example, the method 410 may move from step 418 to step 422, skipping step 420, when the confidence level for the initial orientation setting and/or for the determination of the orientation delta is above a confidence threshold; when the confidence level is not above the confidence threshold, step 420 is performed after step 418 and before step 422 to solicit approval from the operator of the system 100. By way of another example, the method may move from step 418 to step 422 when the orientation delta is one of a number of predetermined values, e.g., 90°, 180°, 270°, and may move to step 420 when the orientation delta is a value different from the predetermined values. Other situations may dictate whether step 418 leads to step 422 or to step 420, as appropriate.

As part of step 424, the method 410 includes obtaining additional frames of the video stream 112 having a different orientation than an orientation of the frame 310, 320, 330 of the video stream 112. Once the configuration change is obtained by the camera 110, as part of step 422, and applied by the camera to update the initial orientation setting, the new orientation setting for the camera 110 results in the video stream 112 producing frames having a different orientation that that of the frame 310, 320, 330 used as part of step 414 of the method 410. The frames of the video stream 112 produced subsequent to the update of the orientation setting of the camera 110 may be aligned with the desired orientation setting for the camera 110, considered as part of step 416.

With additional reference to FIG. 3, by way of a first example, the pixel data of frame 310 is analyzed as part of step 414 to determine an initial orientation setting of "reversed" for the camera 110. The "reversed" orientation setting of the camera 110 is compared to a desired orientation setting of "upright", as part of step 416, to determine an orientation delta of 180°. A configuration change is generated, as part of step 418, instructing the camera 110 to change the initial orientation setting (e.g., rotate −180), and is provided to the camera 110, as part of step 422, to update the orientation setting of the camera 110. Subsequently generated frames of the video stream 112 then have a different orientation than the frame 310, having instead the orientation of frame 216. By way of a second example, the pixel data of frame 320 is analyzed as part of step 414 to determine an initial orientation setting of 90° for the camera 110. The 90° orientation setting of the camera 110 is compared to a desired orientation setting of 0°, as part of step 416, to determine an orientation delta of 90°. A configuration change is generated, as part of step 418, instructing the camera 110 to change the initial orientation setting (e.g., rotate −90), and is provided to the camera 110, as part of step 422, to update the orientation setting of the camera 110. Subsequently generated frames of the video stream 112 then have a different orientation than the frame 310, having instead the orientation of frame 216. It should be understood that the pixel data analysis and orientation delta could be expressed in other terms, whether qualitatively or quantitatively, depending on the implementation.

In this fashion, by analyzing a frame of the video stream 112 produced by the camera 110, for instance one of the frames 310, 320, 330, an incorrect orientation setting of the camera 110 can be corrected, without resorting to a visual inspection of the physical installation of the camera 110. Additionally, although process for correcting the configuration of the camera 110 may solicit input from the operator, the process may begin with or without operator input (e.g., an operator may initiate a request to validate the orientation setting of a particular camera). Thus, the method 410 for correcting a camera configuration for a fixed-position surveillance camera may operate autonomously or semi-autonomously, depending on the implementation.

The method 410 may be implemented at any suitable time, under any suitable conditions, and in response to any suitable input. In some embodiments, the method 410 is implemented periodically, for instance to check for tampering of the camera 110 (which might result in a low confidence score for the initial orientations setting and/or for the orientation delta). The method 410 may also be implemented in response to known events occurring in the vicinity of the camera 110. For example, the method 410 may be implemented following a weather event or natural disaster (strong winds or hurricane, strong rains or flooding, fires, etc.), following a maintenance event (nearby renovations, construction work, etc.), following an emergency event (e.g., a traffic crash, a protest, etc.), or the like. Other triggers for initiating the method 410 are also considered.

Figure 4B:
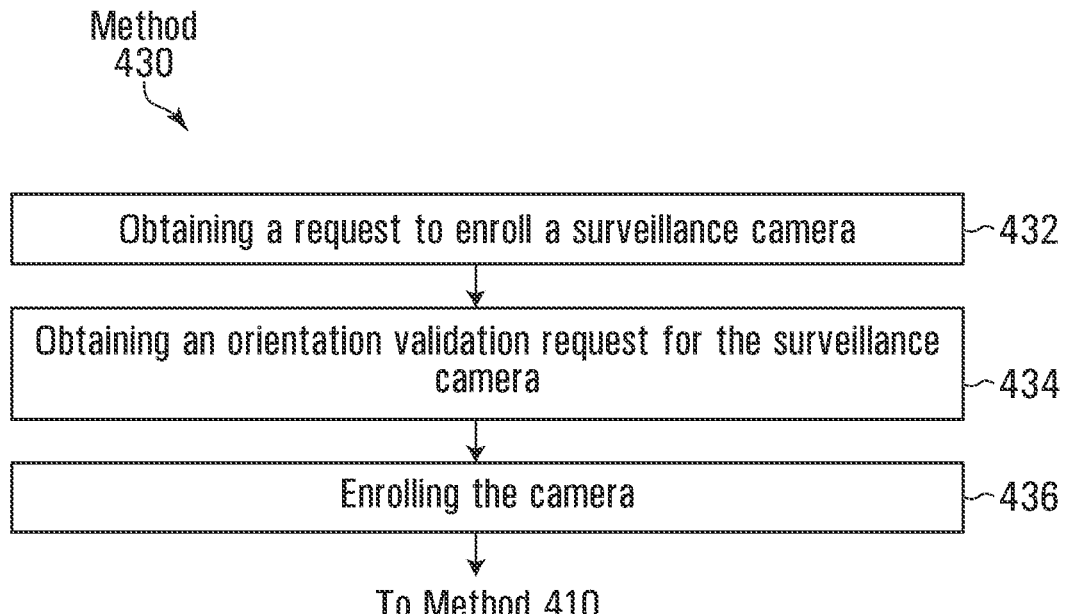
FIG. 4B is a flowchart illustrating an example method for enrolling a surveillance camera.

With additional reference to FIG. 4B, in some embodiments the method 410 is implemented as part of an enrollment method 430 for enrolling a surveillance camera, for instance the camera 110. At step 432, the method 430 includes obtaining a request to enroll the camera 110: the request may come from the camera 110 itself, from an element within the surveillance network 120, from or at the server 130, or from any other suitable source. In some embodiments, an operator of the surveillance system 100 may issue the request to enroll the camera 110.

At step 434, the method 430 includes obtaining an orientation validation request for the camera 110. In some embodiments, the orientation validation request is included as part of the enrollment request for the camera 110: in such embodiments, steps 432 and 434 may be executed together. In some other embodiments, the orientation validation request is obtained separately from the enrollment request. For example, the enrollment request may be obtained at the server 130 from a device in the surveillance network 120, and the orientation validation request may be obtained at the server 130 from the camera 110. By way of another example, the enrollment request may be obtained at the server 130 from the camera 110, and the orientation validation request may be obtained at the server 130 from an operator of the system 100, who may be interfacing (directly or indirectly) with the server 130. Other examples are also considered.

At step 436, the camera 110 is enrolled, for instance into the VMS operated by the server 130 and/or by other components of the surveillance system 100. The method 430 may then move to implement the steps of the method 410 to validate the orientation of the camera 110, in accordance with the orientation validation request obtained at step 434. In some embodiments, the enrollment process may include issuing a configuration to the camera 110; in some such embodiments, the method 410 may be implemented as part of the method 430, and specifically as part of step 436. In some embodiments, the entity implementing the method 430 may be the same as the entity subsequently implementing the method 410. In some other embodiments, the methods 410 and 430 are performed collectively by a plurality of devices within the surveillance system 100.

Figure 5:
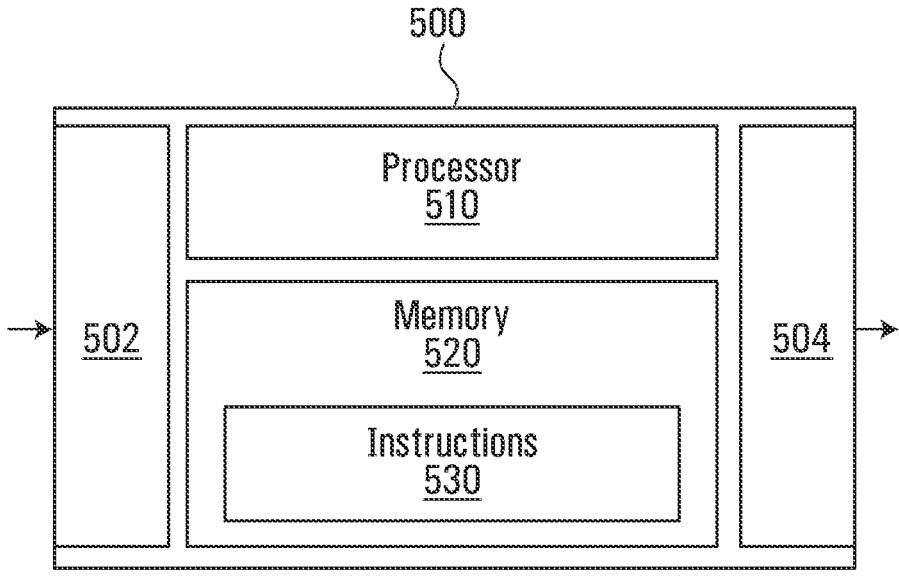
FIG. 5 is a block diagram of an example computing system.

With reference to FIG. 5, there is illustrated a schematic diagram of an example computing device 500. As depicted, the computing device 500 includes at least one processor 510, a memory 520, and program instructions 530 stored within the memory 520, as well as input and output interfaces (I/O interfaces) 502 and 504, respectively. For simplicity, only one computing device 500 is shown; the camera 110, the server 130, and/or any other computing devices included as part of other elements of the present disclosure (e.g., subcomponents or sensors of the camera 110, elements of the surveillance network 120, etc.) may be embodied by one or more implementations of the computing device 500, which may be the same or different types of devices. The components of the computing device 500 may be connected in various ways including directly coupled, indirectly coupled via a network, and distributed over a wide geographic area and connected via a network, for instance via a cloud computing implementation.

The I/O interfaces 502, 504 may include one or more media interfaces, via which removable media or other data sources may be coupled, one or more network interfaces, or any other suitable type of interface. The I/O interfaces 502, 504 of the computing device 500 may additionally, in some embodiments, provide interconnection functionality to one or more input devices, such as a keyboard, mouse, camera, touch screen and a microphone, or with one or more output devices such as a display screen and a speaker, for instance devices via which a user may interact with the server 130. In embodiments in which the I/O interfaces 502, 504 include one or more network interfaces, the network interface(s) of the computing device 500 may enable the computing device 500 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The processor 510 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. The processor 510 may be configured for executing the instructions 530 stored within the memory 520. The memory 520 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically erasable programmable read-only memory (EEPROM), Ferroelectric RAM (FRAM) or the like.

In certain embodiments, the computing device 500 is operable to register and authenticate users (using a login, unique identifier, and password for example) prior to providing access to applications, a local network, network resources, other networks, and network security devices. The computing device 500 may serve one user or multiple users.

For example, and without limitation, the computing device 500 may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods and/or implementing the systems described herein.

In some embodiments, the camera 110 is a computerized camera, implemented by way of a computing device 500. In other words, the camera 110 may contain a processor (e.g., the processor 510) which controls, or substantially controls, the operation of the camera 110. The camera 110 may also contain an imaging unit and a network interface (e.g., implemented by way of the I/O interfaces 502, 504) which are both in communication with the processor 510, thereby allowing the processor to control their operation, as well as a memory (e.g., the memory 520) which stores instructions (e.g., the instructions 530) executable by the processor 510. In this fashion, the camera 110 may be configured to implement part or all of the steps of the methods 410, 430, as described hereinabove.

Figure 6:
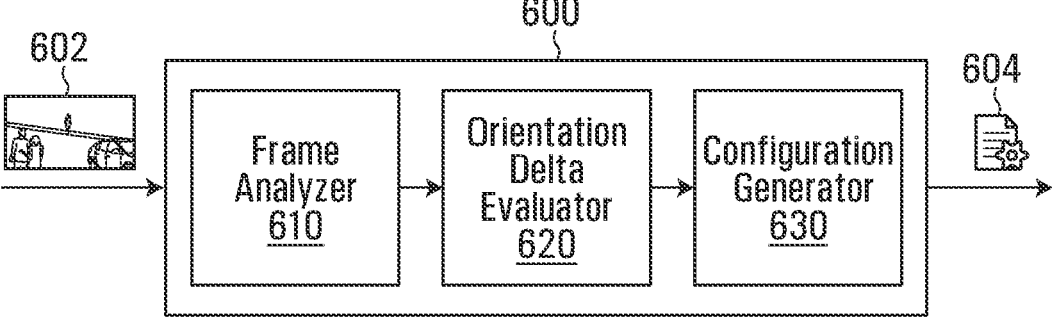
FIG. 6 is a block diagram of an example configuration corrector.

With reference to FIG. 6, an example camera configuration correction system 600 is illustrated as being composed of a frame analyzer 610, an orientation delta evaluator 620, and a configuration generator 630. The camera configuration correction system 600 obtains, as an input, a frame 602 of a video stream, for instance the video stream 112 generated by the camera 110. The frame 602 is used by the frame analyzer 610 to derive an initial orientation setting of the camera 110. The initial orientation setting of the camera is provided to the orientation delta evaluator 620, which determines an orientation delta between the initial orientation setting and a desired orientation setting for the camera 110. The orientation delta is then provided to the configuration generator 630, which generates a configuration change for the camera 110, for instance to bring the orientation setting of the camera into alignment with the desired orientation setting. The configuration generator 630 may also, once the configuration is generated, issue an alert to an operator of the camera configuration correction system 600 (or of a system of which the camera configuration correction system 600 forms part, for instance the surveillance system 100). The alert may solicit approval from the operator, present information relating to the configuration change to the operator, or the like. The camera configuration correction system 600 may then output the configuration change, for instance in the form of a configuration file 604, to provide the configuration change to the camera 110.

The embodiments of the methods, systems, devices, and computer-readable media described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references have been made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The terms "connected" or "coupled to", as well as any similar terms, may include both direct coupling (in which two elements that are coupled to each other contact each other) and indirect coupling (in which at least one additional element is located between the two elements).

The use of numerical ranges by endpoints in the present disclosure should be understood as including all numbers within that range (e.g., 1 to 5 includes 1, 1.25, 2, 2.5, 3, 3.69, 4, 4.33, 5, etc.). Where a range of values is qualified as being "greater than", "less than", etc., of a particular value, that value may or may not be included within the range, as appropriate.

Any direction or orientation described in the present disclosure, including but not limited to "top", "bottom", "left", "right", "upper", "lower", "above", "below", as well as other directions and orientations, are described herein for clarity, and should be understood in reference to the drawings. These and other similar terms should not be understood as limiting of an actual device or system or of use of the device or system. Many of the devices, articles, or systems described in the present disclosure may be used in a number of suitable directions and orientations.

Any citation to references in this disclosure and during the prosecution thereof is made out of an abundance of caution. No citation should be construed as an admission that the cited reference qualifies as prior art or comes from an area that is analogous or directly applicable to the present teachings.

To aid the Patent Office, as well as any readers of any patent issued from this application, in interpreting the claims appended hereto, it is noted that none of the appended claims or elements of the appended claims, as pending or as granted, are intended to invoke 35 U.S.C. 112 (f) unless the words "means for" or "step for" are explicitly used in the particular claim or claim or claim element.

The technical solution of embodiments may be in the form of a software product. The software product may be stored in a non-volatile or non-transitory computer-readable storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and at least some of the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions, and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the examples described above and illustrated herein are intended to be examples only, and the appended claims are intended to include within their scope such processes, machines, manufacture, compositions of matter, means, methods, or steps.

Generally, all terms used in the claims are to be interpreted according to their ordinary meaning in the relevant technical field, unless explicitly defined otherwise herein. All references to a/an/the element, apparatus, component, means, step, etc., are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second", etc. for different features/components of the present disclosure are only intended to distinguish the features/components from other similar features/components and not to impart any order or hierarchy to the features/components.

The invention claimed is:

1. A method for correcting a camera configuration for a surveillance camera having a fixed position, comprising:
   obtaining a video stream generated by the surveillance camera, the video stream comprising a plurality of frames;
   analyzing a pattern present in pixel data of a frame of the video stream to derive an initial orientation setting of the surveillance camera;
   determining an orientation delta between the initial orientation setting of the surveillance camera and a desired orientation setting for the surveillance camera based on the analyzing of the pattern present in the pixel data of the frame;
   generating a configuration change for the surveillance camera; and
   providing the configuration change to the surveillance camera to cause the surveillance camera to update the initial orientation setting of the surveillance camera.

2. The method of claim 1, comprising obtaining, subsequent to providing the configuration change to the surveillance camera, additional frames of the video stream having a different orientation than an orientation of the frame of the video stream.

3. The method of claim 1, wherein analyzing the pattern present in the pixel data of the frame comprises performing object detection to determine that an orientation of an object differs vis-à-vis an expected orientation for the object.

4. The method of claim 1, wherein performing object detection comprises detecting a person.

5. The method of claim 1, wherein performing object detection comprises detecting a landmark.

6. The method of claim 1, wherein generating the configuration change comprises generating a configuration change specifying a rotation for future frames of the video stream.

7. The method of claim 1, wherein generating the configuration change comprises generating a configuration change specifying a reflection for future frames of the video stream.

8. The method of claim 1, comprising, responsive to the determining of the orientation delta, issuing an alert to an operator of a surveillance system associated with the surveillance camera.

9. The method of claim 8, comprising obtaining input from the operator approving the configuration change, wherein the providing of the configuration change occurs responsive to the obtaining of the input from the operator.

10. The method of claim 8, wherein issuing the alert to the operator comprises presenting a confidence level associated with the determining that the orientation of the object differs vis-à-vis the expected orientation.

11. The method of claim 8, wherein issuing the alert to the operator comprises presenting a plurality of potential corrections for the surveillance camera to be included in the configuration change.

12. The method of claim 8, wherein issuing the alert to the operator comprises presenting an indication of a potential installation issue associated with the surveillance camera.

13. The method of claim 1, comprising comparing a confidence level associated with the initial orientation setting with a confidence threshold, wherein, when the confidence level does not meet the confidence threshold, issuing an alert to the operator indicating a potential issue with the surveillance camera.

14. The method of claim 1, wherein the method forms part of a surveillance camera enrollment method comprising
   obtaining a request to enroll the surveillance camera; and
   responsive to obtaining the request, enrolling the surveillance camera,
   wherein the obtaining of the video stream occurs subsequent to the enrolling of the surveillance camera.

15. The method of claim 14, wherein the request to enroll comprises an orientation validation request for the surveillance camera.

16. The method of claim 1, wherein the obtaining, analyzing, determining, generating, and providing are performed subsequent to identifying an occurrence of an event in a vicinity of the surveillance camera.

17. The method of claim 16, wherein identifying the occurrence of the event comprises identifying: a weather event; a maintenance event; and/or an emergency event.

18. The method of claim 1, comprising receiving an orientation validation request from the surveillance camera, wherein the obtaining, detecting, analyzing, generating, and providing are performed in response to receiving the orientation validation request.

19. The method of claim 1, wherein the obtaining, analyzing, determining, generating, and providing are repeated periodically.

20. The method of claim 1, wherein obtaining the video stream comprises obtaining, at a video management system, the video stream from the surveillance camera, and wherein providing the configuration change to the surveillance camera comprises transmitting, from the video management system, the configuration change to the surveillance camera over a network.

21. The method of claim 1, wherein the method is implemented within the surveillance camera.

22. A surveillance camera for use in fixed-position surveillance, comprising:

an imaging unit;

a network interface;

a processor in communication with the imaging unit and the network interface; and a non-transitory computer-readable memory storing computer instructions executable by the processor for:

obtaining a video stream generated by the surveillance camera, the video stream comprising a plurality of frames;

analyzing a pattern present in pixel data of a frame of the video stream to derive an initial orientation setting of the surveillance camera;

determining an orientation delta between the initial orientation setting of the surveillance camera and a desired orientation setting for the surveillance camera based on the analyzing of the pattern present in the pixel data of the frame;

generating a configuration change for the surveillance camera; and providing the configuration change to the surveillance camera to cause the surveillance camera to update the initial orientation setting of the surveillance camera.

23. A surveillance system for use in fixed-position surveillance, comprising:

a server implementing a video management system, the server in communication with a surveillance camera over a surveillance network;

wherein the server comprises:

a processor; and a non-transitory computer-readable memory storing computer instructions executable by the processor for:

obtaining a video stream generated by the surveillance camera, the video stream comprising a plurality of frames;

analyzing a pattern present in pixel data of a frame of the video stream to derive an initial orientation setting of the surveillance camera;

determining an orientation delta between the initial orientation setting of the surveillance camera and a desired orientation setting for the surveillance camera based on the analyzing of the pattern present in the pixel data of the frame;

generating a configuration change for the surveillance camera; and providing the configuration change to the surveillance camera to cause the surveillance camera to update the initial orientation setting of the surveillance camera.

24. The system of claim 23, wherein the computer instructions are executable by the processor for obtaining, subsequent to providing the configuration change to the surveillance camera, additional frames of the video stream having a different orientation than an orientation of the frame of the video stream.

25. The system of claim 23, wherein analyzing the pattern present in the pixel data of the frame comprises performing object detection to determine that an orientation of an object differs vis-à-vis an expected orientation for the object.

26. The system of claim 23, comprising, responsive to the determining of the orientation delta, issuing an alert to an operator of the surveillance system.

27. The system of claim 26, comprising obtaining input from the operator approving the configuration change, wherein the providing of the configuration change occurs responsive to the obtaining of the input from the operator.

28. The system of claim 23, wherein the computer instructions are executable by the processor for performing a surveillance camera enrollment process comprising obtaining a request to enroll the surveillance camera; and responsive to obtaining the request, enrolling the surveillance camera, wherein the obtaining of the video stream occurs subsequent to the enrolling of the surveillance camera.

29. The system of claim 23, wherein the computer instructions are executable by the processor for receiving an orientation validation request from the surveillance camera, wherein the obtaining, detecting, determining, generating, and providing are performed in response to receiving the orientation validation request.

* * * * *